(12) United States Patent
Ashikaga

(10) Patent No.: US 7,630,572 B2
(45) Date of Patent: Dec. 8, 2009

(54) IMAGE PROCESSING APPARATUS, IMAGE PROCESSING METHOD, AND COMPUTER PROGRAM

(75) Inventor: Hideaki Ashikaga, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 777 days.

(21) Appl. No.: 11/448,686

(22) Filed: Jun. 8, 2006

(65) Prior Publication Data

US 2006/0285763 A1 Dec. 21, 2006

(30) Foreign Application Priority Data

Jun. 16, 2005 (JP) .............................. 2005-175910

(51) Int. Cl.
*G06K 9/40* (2006.01)
(52) U.S. Cl. ...................... 382/254; 382/256; 382/260; 382/275; 358/3.26; 358/3.27; 358/463
(58) Field of Classification Search ................. 382/256, 382/257, 258, 259, 260; 358/3.26, 3.27, 358/463
See application file for complete search history.

(56) References Cited

U.S. PATENT DOCUMENTS

| | | | |
|---|---|---|---|
| 5,623,558 A | | 4/1997 | Billawala et al. |
| 5,694,494 A | | 12/1997 | Hart et al. |
| 6,628,406 B1 | * | 9/2003 | Kreuzer ....................... 356/508 |
| 6,760,487 B1 | * | 7/2004 | Linares ........................ 382/275 |
| 6,785,259 B2 | * | 8/2004 | Le et al. ...................... 370/349 |
| 6,990,480 B1 | * | 1/2006 | Burt .............................. 707/1 |
| 7,200,626 B1 | * | 4/2007 | Hoang et al. ................. 707/204 |

FOREIGN PATENT DOCUMENTS

| | | |
|---|---|---|
| JP | A-08-063546 | 3/1996 |
| JP | A-2004-213230 | 7/2004 |
| JP | A-2004-341914 | 12/2004 |

* cited by examiner

*Primary Examiner*—Yosef Kassa
(74) *Attorney, Agent, or Firm*—Oliff & Berridge, PLC

(57) ABSTRACT

Image data to be recovered having a loss part is input into an image processing apparatus. The image processing apparatus generates restoration data with the loss part corrected. The image processing apparatus includes a thinning processing unit, an end-point extraction unit, a pair-of-connection-end-point extraction unit and a connection unit. The thinning processing unit executes thinning processing with respect to the image data to be recovered having the loss part. The end-point extraction unit executes finding end points of thinned lines of the image data generated by the thinning processing unit. The pair-of-connection-end-point extraction unit extracts a pair of connection end points to be connected from the end points extracted by the end-point extraction unit. The connection unit connects the pair of connection end points extracted by the pair-of-connection-end-point extraction unit.

20 Claims, 19 Drawing Sheets

FIG. 7
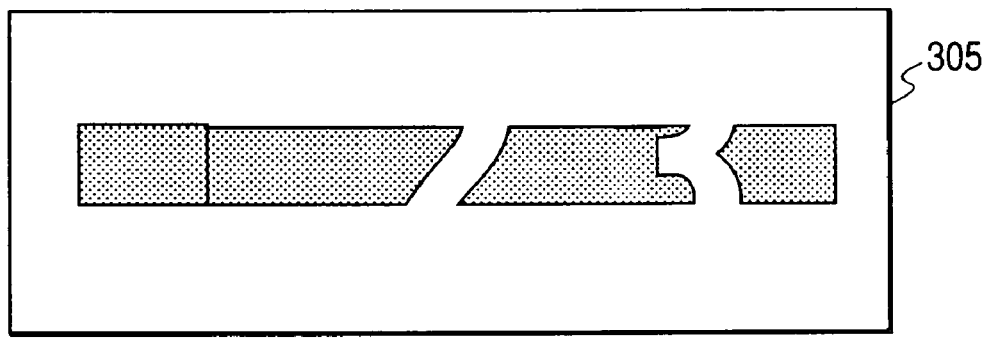
EXPANSION DATA
ROUNDING PROCESSING
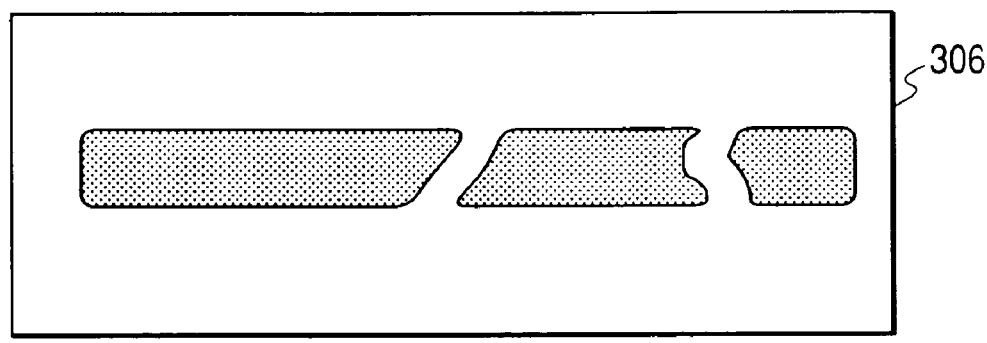
ROUNDED EXPANSION DATA

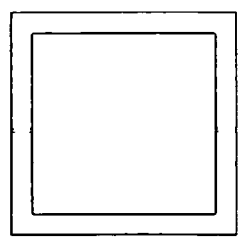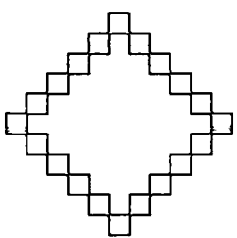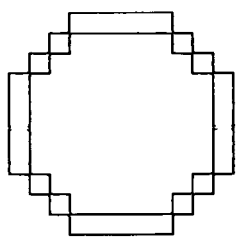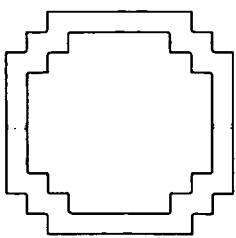
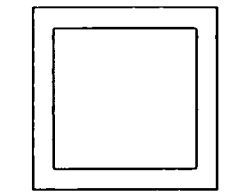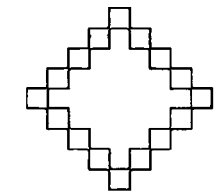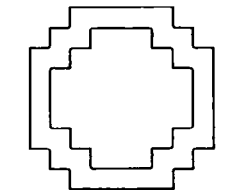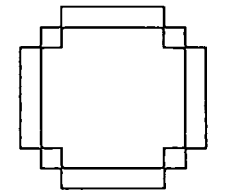
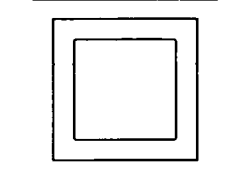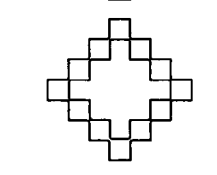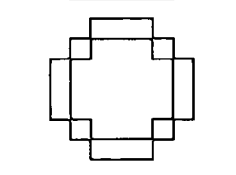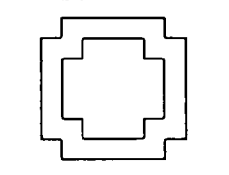
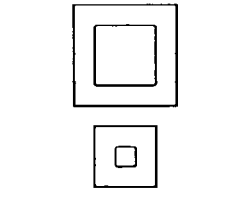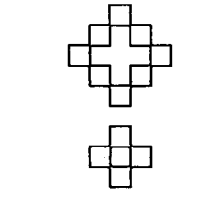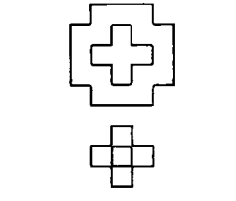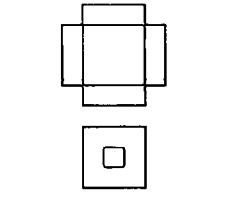
FIG. 9A  8 NEIGHBORHOOD EXPANSION PROCESSING
FIG. 9B  4 NEIGHBORHOOD EXPANSION PROCESSING
FIG. 9C  4-8 NEIGHBORHOOD EXPANSION PROCESSING
FIG. 9D  8-4 NEIGHBORHOOD EXPANSION PROCESSING FIG. 11
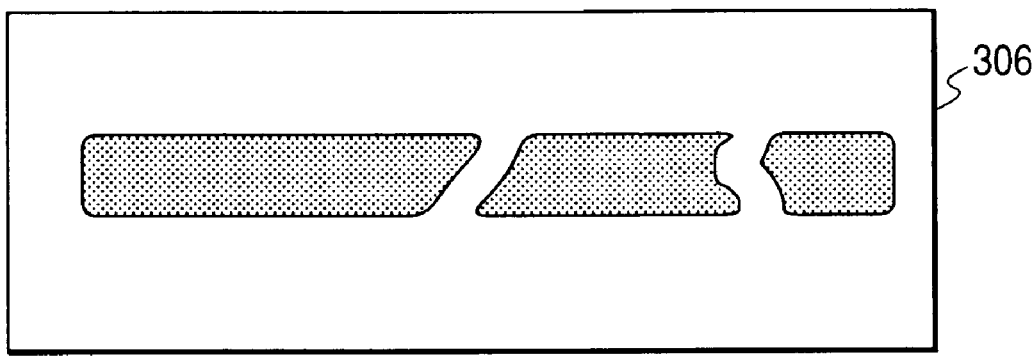
ROUNDED EXPANSION DATA
THINNING PROCESSING
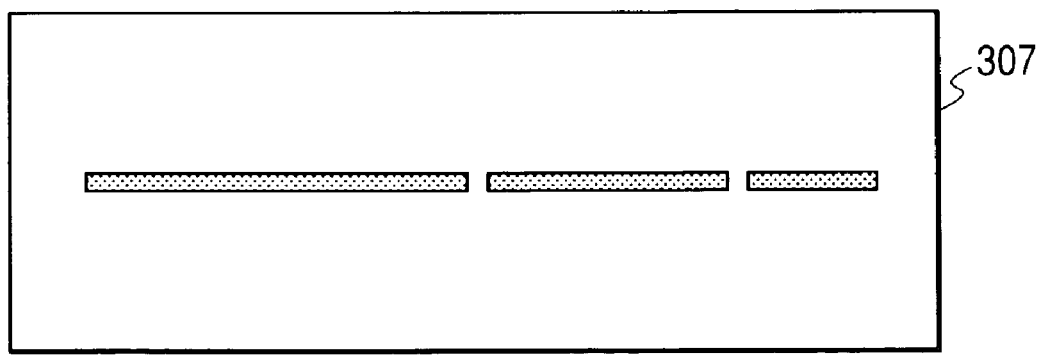
THINNED DATA

FIG. 14
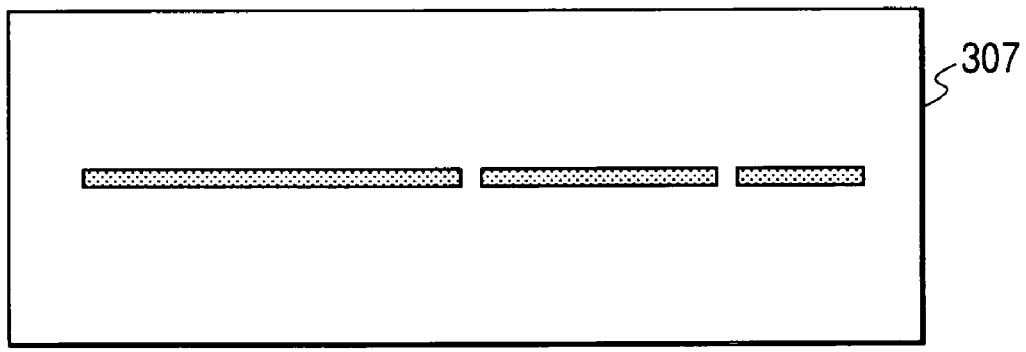
THINNED DATA
END-POINT EXTRACTION
PROCESSING
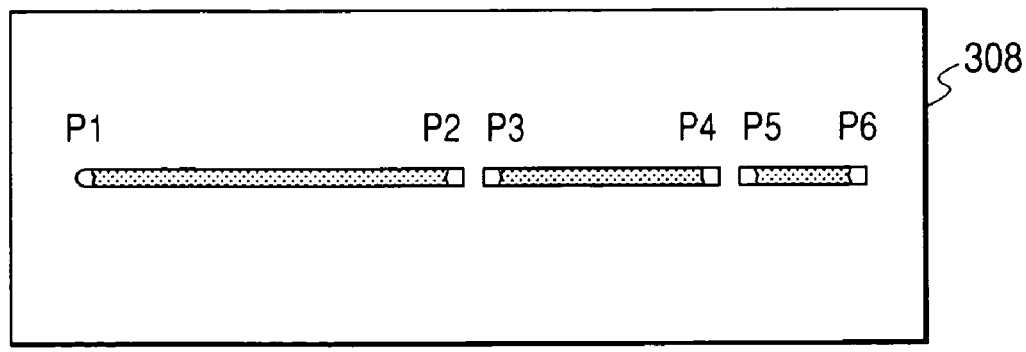
END-POINT EXTRACTION DATA

FIG. 15
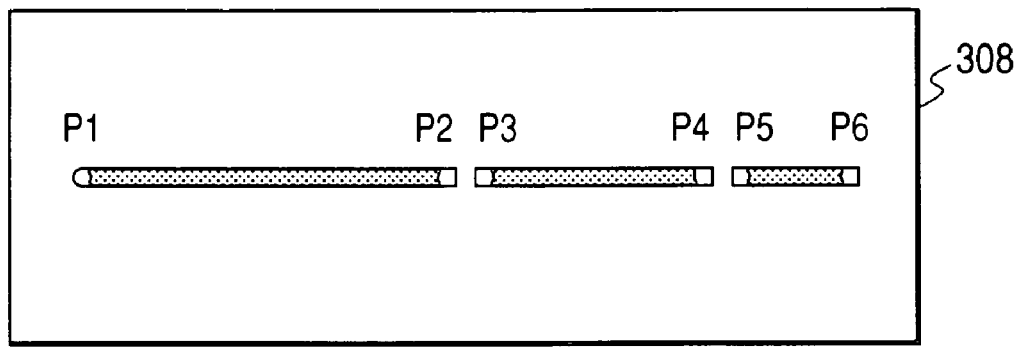
END-POINT EXTRACTION DATA
PAIR-OF-CONNECTION-END-POINT EXTRACTION PROCESSING
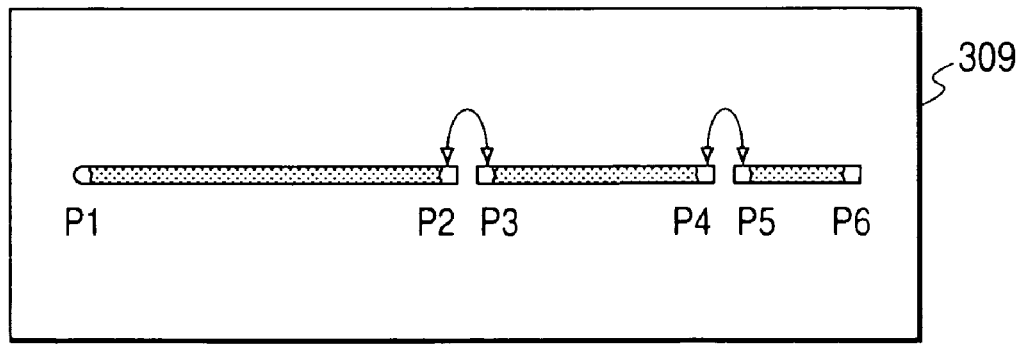
PAIR-OF-CONNECTION-END-POINT EXTRACTION DATA

FIG. 16
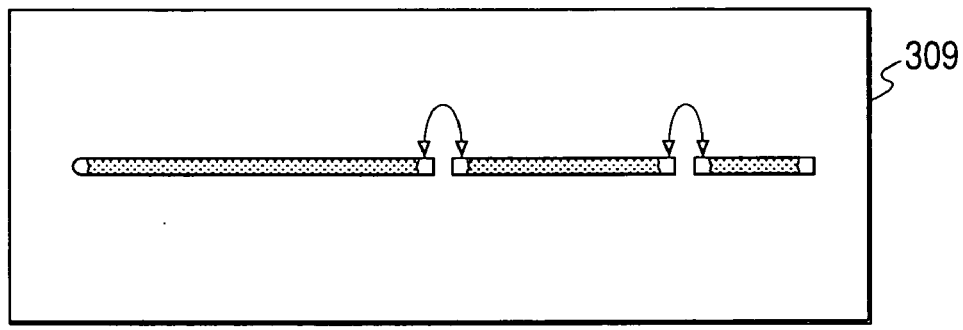
PAIR-OF-CONNECTION-END-POINT EXTRACTION DATA
CONNECTION PROCESSING
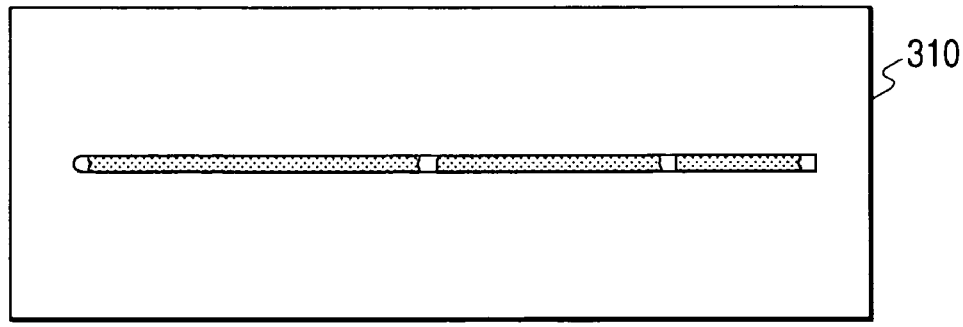
END-POINT CONNECTION DATA FIG. 17
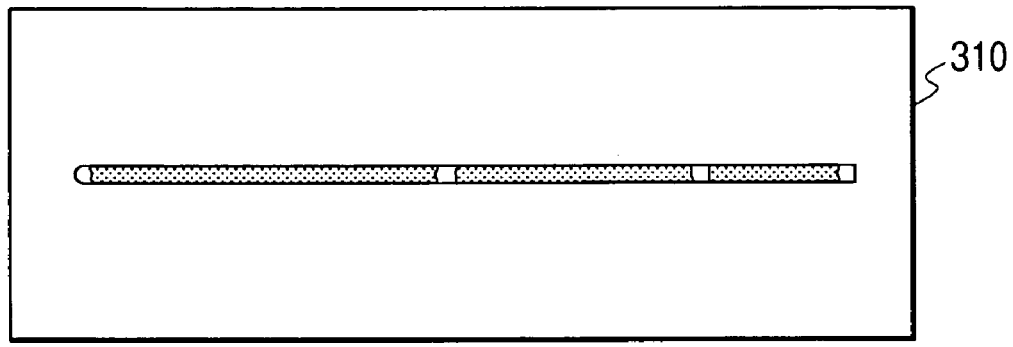
END-POINT CONNECTION DATA
EXPANSION (THICKENING) PROCESSING
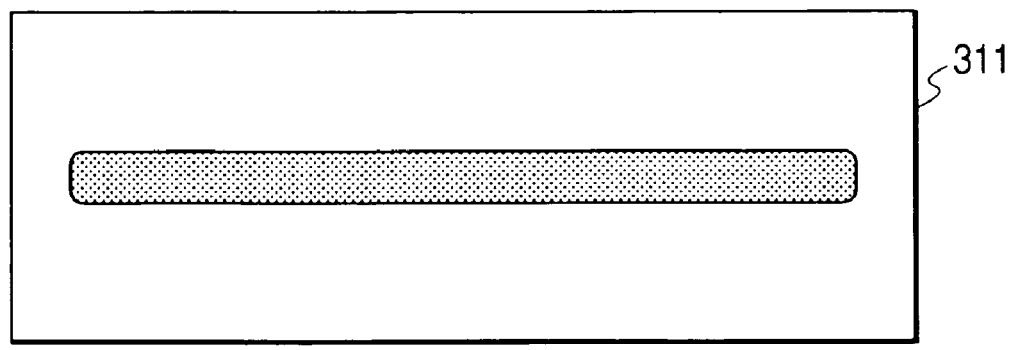
RESTORATION DATA

IMAGE PROCESSING APPARATUS, IMAGE PROCESSING METHOD, AND COMPUTER PROGRAM

CROSS-REFERENCE TO RELATED APPLICATION

This application claims priority under 35 U.S.C. 119 from Japanese patent application No. 2005-208758 filed on Jun. 16, 2006, the disclosure of which is incorporated by reference herein.

BACKGROUND

1. Technical Field

This invention relates to an image processing apparatus, an image processing method, and a computer program. More particularly, the invention relates to an image processing apparatus, an image processing method, and a computer program for efficiently executing recovery of line drawing data containing a loss part obtained by performing various types of data extraction processing such as recovery processing of a loss part contained in the difference data between an original document and a postscribed document performed in analysis processing of postscribed information, etc., for example.

2. Related Art

In an image processing field, various types of research and development are conducted on processing of extracting a portion postscribed in a document output from a printer, a FAX, etc., for example, by the user with a pen, a pencil, a stamp, etc., and checking whether or not a security document is tampered with. Generally, such postscript check processing and tampering check processing involve processing of making a comparison between original document data and an output document having a possibility of postscript, etc.

That is, the difference between scan image data provided by scanning the document from which postscribed portion is to be detected through an image reader and original image data stored in a PC, a printer, etc., is found to obtain postscribed image data.

In this method, however, when the text, pattern, etc., originally existing in a paper document and the postscribed portion overlap, if an attempt is made to find the difference from the original document to obtain postscribed information, the acquired postscribed information does not contain the overlap with the original document and postscribed text, pattern, etc., becomes broken data.

SUMMARY

According to an aspect of the invention, image data to be recovered having a loss part is input into an image processing apparatus. The image processing apparatus generates restoration data with the loss part corrected. The image processing apparatus includes a thinning processing unit, an end-point extraction unit, a pair-of-connection-end-point extraction unit and a connection unit. The thinning processing unit executes thinning processing with respect to the image data to be recovered having the loss part. The end-point extraction unit executes finding end points of thinned lines of the image data generated by the thinning processing unit. The pair-of-connection-end-point extraction unit extracts a pair of connection end points to be connected from the end points extracted by the end-point extraction unit. The connection unit connects the pair of connection end points extracted by the pair-of-connection-end-point extraction unit.

A computer program according to another aspect of the invention may be one that can be provided by a record medium or a communication medium for providing the computer program for a computer system that can execute various program codes in a computer-readable format, for example, a record medium such as a CD, an FD, or an MO or a communication medium such as a network. Such a program is provided in the computer-readable format, whereby processing responsive to the program is realized in a computer system.

The above and other objects, features and advantages of the invention will be apparent from the following detailed description of exemplary embodiments of the invention in conjunction with the accompanying drawings. The system in the specification is a logical set made up of a plurality of units (apparatus) and is not limited to a set of units (apparatus) housed in a single cabinet.

BRIEF DESCRIPTION OF THE DRAWINGS

Exemplary embodiments of the invention will be described in detail based on the following figures, wherein:

FIG. 7 is a drawing to describe a processing example of rounding processing unit in the image processing apparatus according to the exemplary embodiment of the invention;

FIG. 9 is a drawing to describe examples of expansion processing involving applicable rounding processing in the image processing apparatus according to the exemplary embodiment of the invention;

FIG. 11 is a drawing to describe an execution example of thinning processing executed by thinning processing unit in the image processing apparatus according to the exemplary embodiment of the invention;

FIG. 14 is a drawing to describe a processing example of end-point extraction unit in the image processing apparatus according to the exemplary embodiment of the invention;

FIG. 15 is a drawing to describe a processing example of pair-of-connection-end-point extraction unit in the image processing apparatus according to the exemplary embodiment of the invention;

FIG. 16 is a drawing to describe a processing example of connection unit in the image processing apparatus according to the exemplary embodiment of the invention;

FIG. 17 is a drawing to describe a processing example of expansion processing unit in the image processing apparatus according to the exemplary embodiment of the invention;

DETAILED DESCRIPTION

An image processing apparatus, an image processing method, and a computer program according to exemplary embodiments of the invention will be discussed below in detail with reference to the accompanying drawings.

Figure 1:
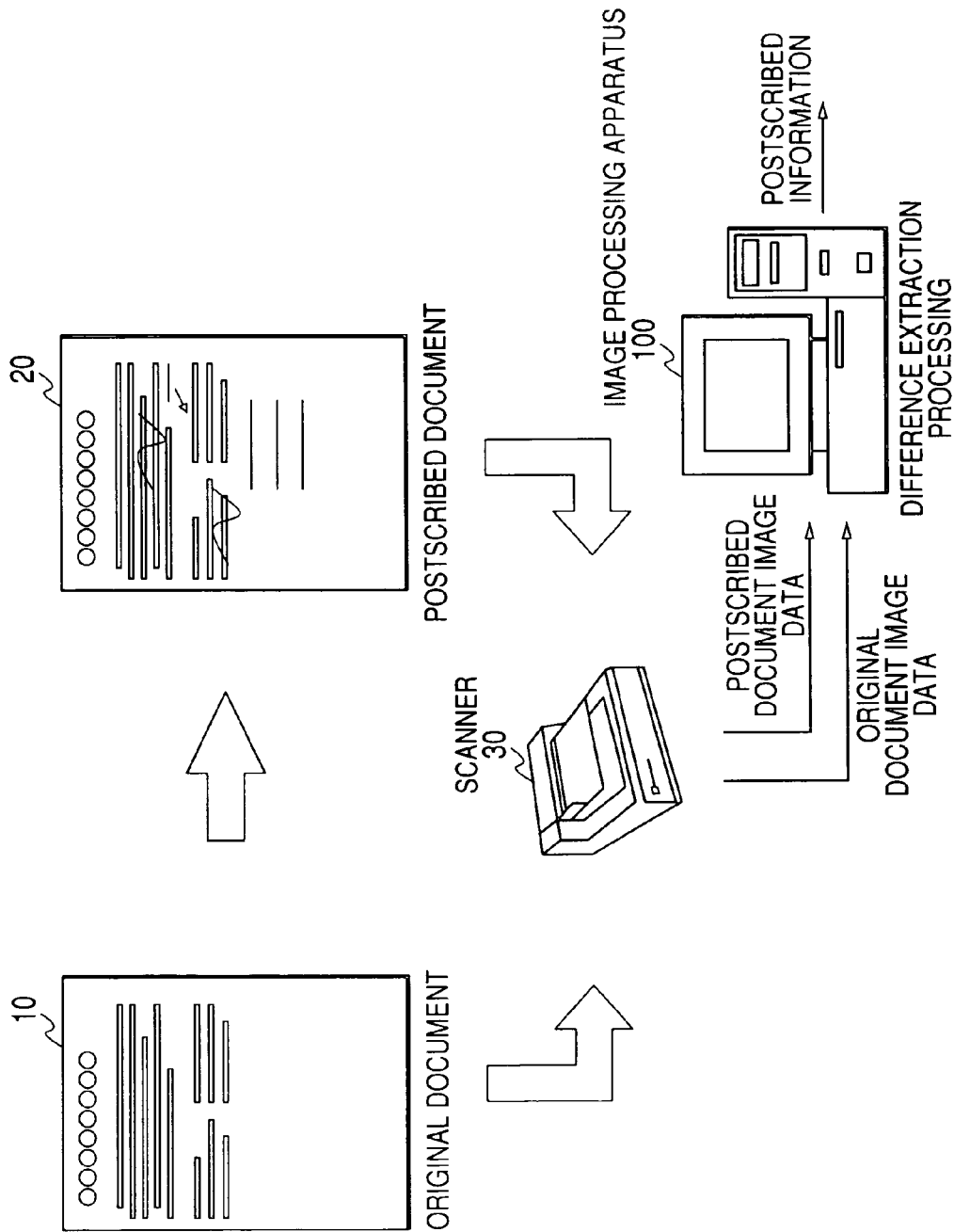
FIG. 1 is a drawing to describe an outline of processing incorporating an image processing apparatus of an exemplary embodiment of the invention.

First, an outline of processing incorporating the image processing apparatus according to one exemplary embodiment will be discussed with reference to FIG. 1 and other drawings. The image processing apparatus of this exemplary embodiment performs processing of recovering a loss part of difference data in processing of extracting the difference between an original document 10 and a postscribed document 20 containing various memos such as a comment and an underline on the original document 10, for example, as shown in FIG. 1, to acquire postscribed data. The image processing apparatus of this exemplary embodiment can be applied to processing of correcting a loss part in data having the loss part obtained by performing various types of processing as well as difference data.

An example shown in FIG. 1 is one processing example and is an example of processing of reading the original document 10 and the postscribed document 20 through a scanner 30, inputting original document image data and postscribed document image data into an image processing apparatus 100, performing difference information acquisition processing, recovering the loss part contained in the difference data, and outputting postscribed information.

Figure 2:
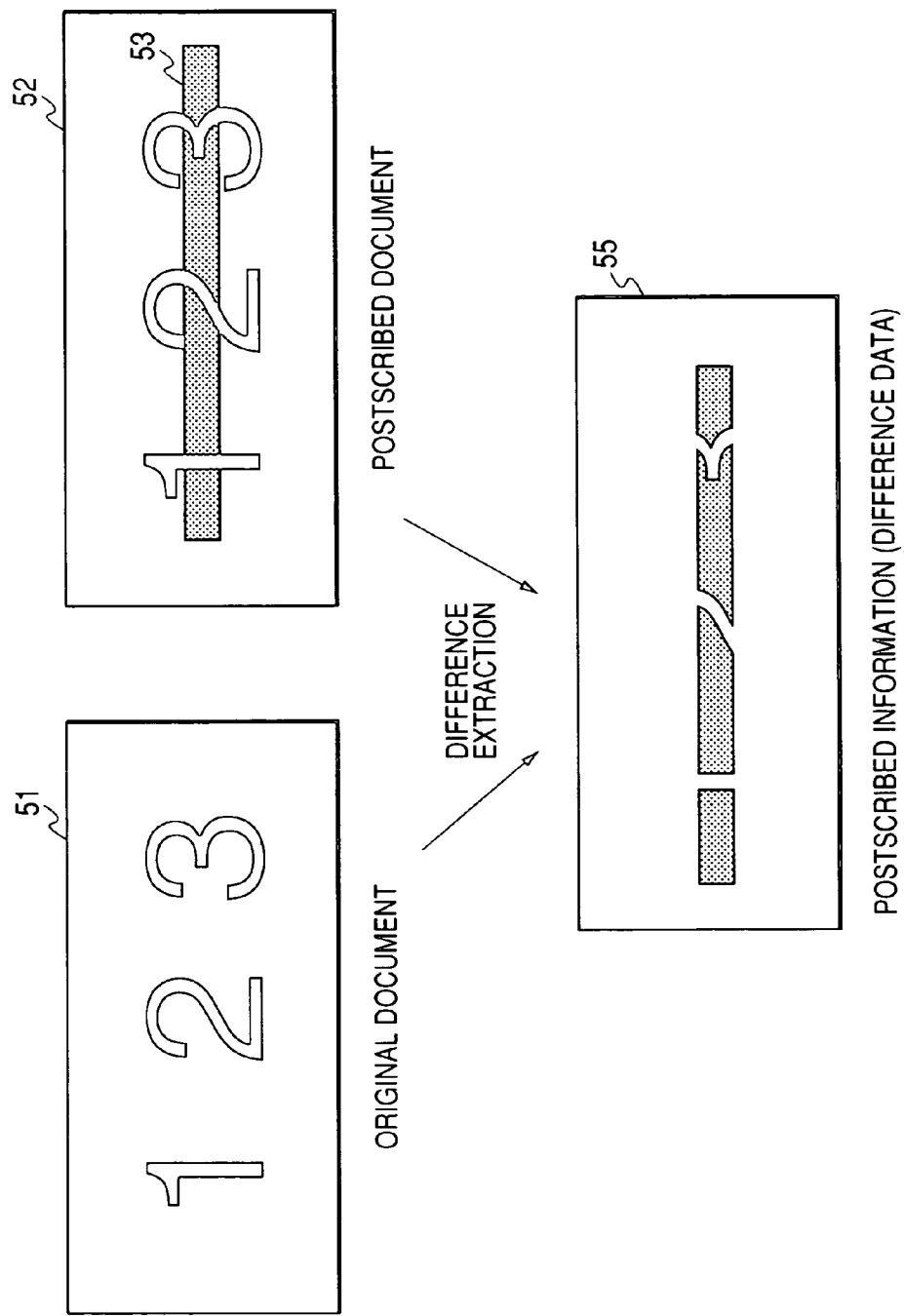
FIG. 2 is a drawing to describe an example of difference data between an original document and a postscribed document as an example of data to be processed by the image processing apparatus according to the exemplary embodiment of the invention.

For example, as shown in FIG. 2, it is assumed that an original document 51 and a postscribed document 52 exist. Originally, postscribed information should be line data 53. However, if the difference data between the original document 51 and the postscribed document 52 is acquired, the original document 51 and the postscribed document 52 are detected as broken data as shown in postscribed information 55 and correct postscribed data cannot be detected. In this exemplary embodiment, the image processing apparatus 100 executes processing of recovering the breaks.

Figure 3A:
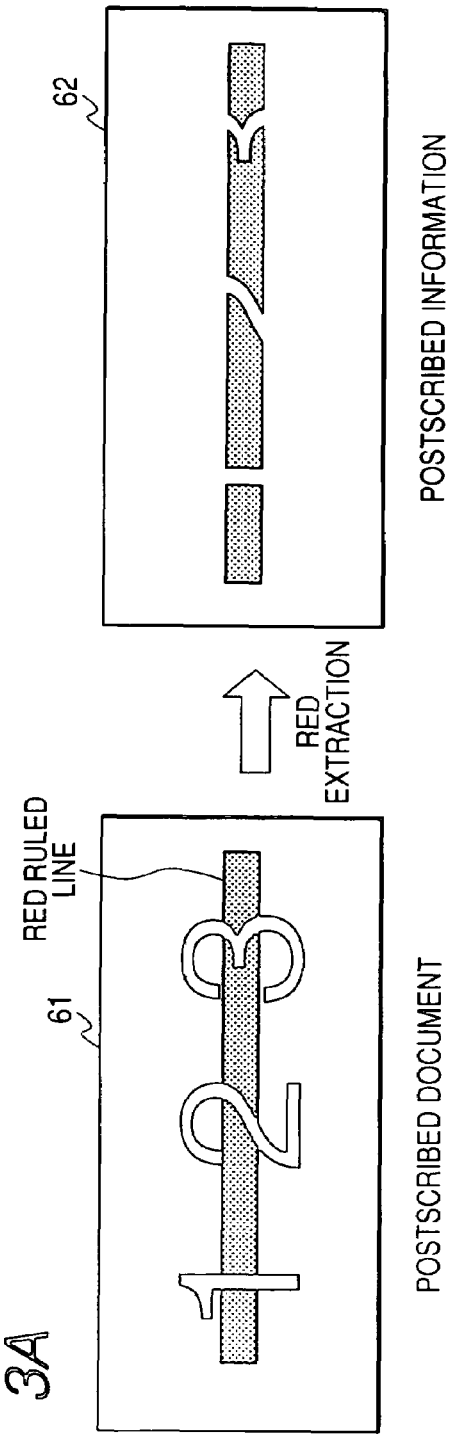
FIG. 3 is a drawing to describe examples of data to be processed by the image processing apparatus according to the exemplary embodiment of the invention.

In the image processing of this exemplary embodiment, not only recovery processing of postscribed information detected based on the difference data shown in FIG. 2, but also recovery of broken data containing various loss parts acquired according to other techniques may be executed. For example, FIG. 3A shows a processing example wherein postscribed information 62 is extracted only from an image of a postscribed document 61 without an original image being used.

For example, if postscribed data is recorded with a different color contained in original image data (for example, red), processing of extracting only the postscribed color data from the postscribed document 61 is performed, thereby acquiring the postscribed information 62. In this case, however, in a portion overlapping with the original data, postscribed information is also acquired as a broken image.

Figure 3B:
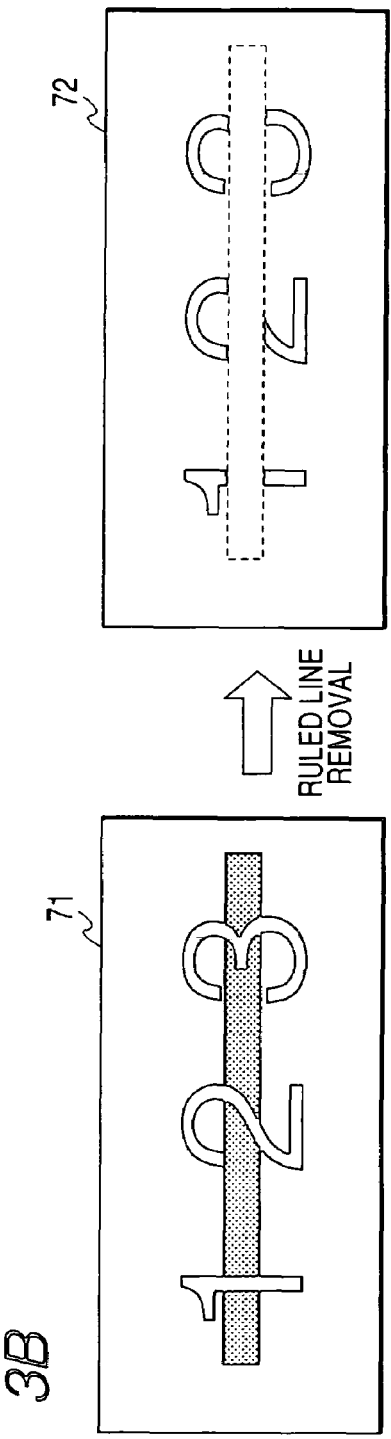

FIG. 3B shows processing of acquiring ruled line removal information 72 provided by removing a ruled line from a ruled document 71. If such processing is performed, as the straight line as the ruled line part is removed, data with removed overlap with the ruled line is output and a part of the original data is lost.

The image processing apparatus 100 of this exemplary embodiment performs processing of correcting the loss part of image data having such a break and/or a loss part and generating unbroken data efficiently and precisely.

Figure 4:
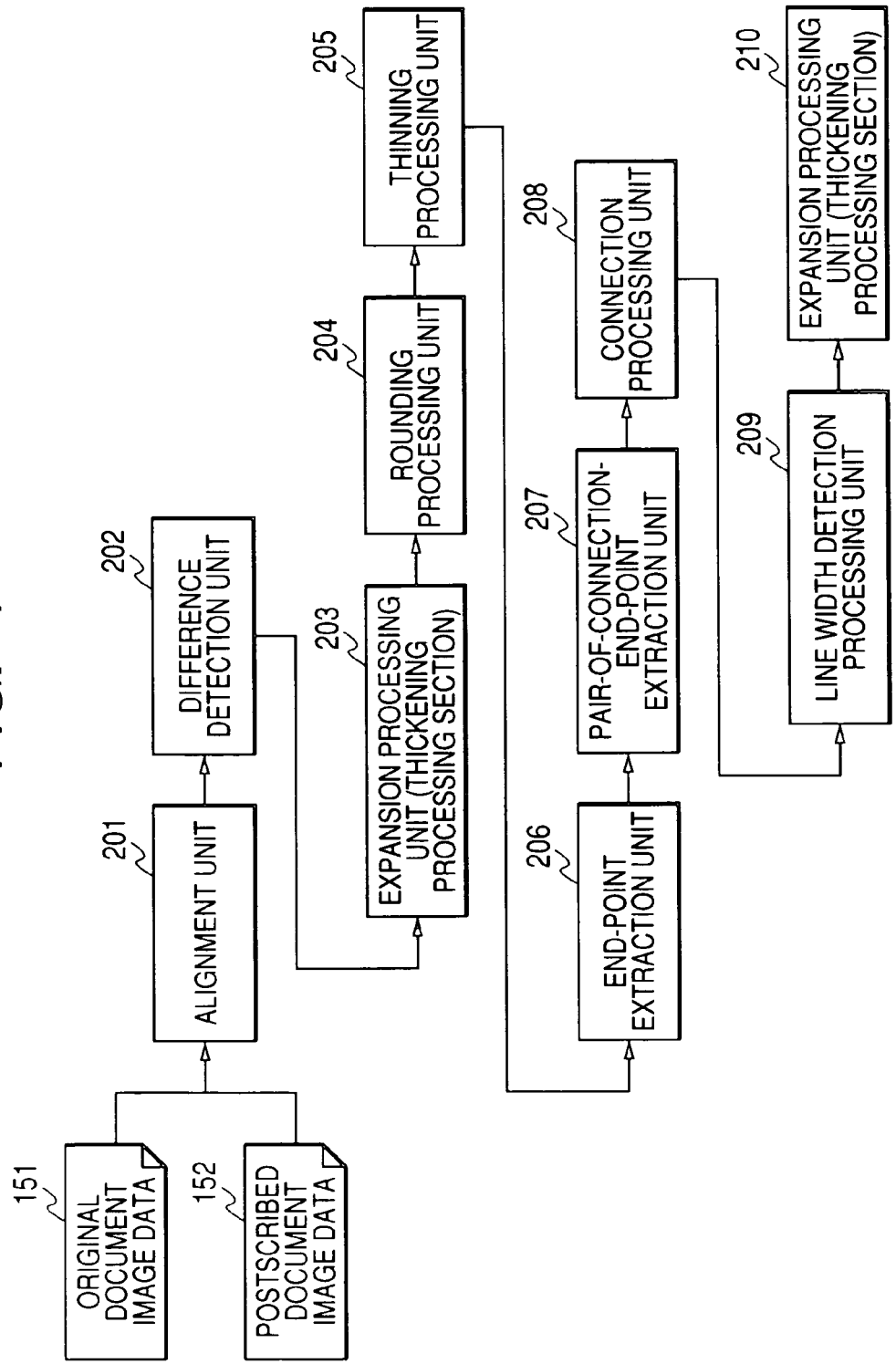
FIG. 4 is a block diagram to show the configuration of the image processing apparatus according to the exemplary embodiment of the invention.

The configuration and processing of the image processing apparatus according to the exemplary embodiment will be discussed below in detail with reference to FIG. 4. First, FIG. 4 is a block diagram of the image processing apparatus according to the exemplary embodiment. In the following embodiment, described will be an processing example in which original document image data 151 and postscribed document image data 152 are input, the difference therebetween is detected, and breaks are recovered based on the detected difference data. However, the image processing apparatus according to the invention can be applied to recovery of not only difference data, but also various pieces of data having loss parts (break parts) as described above.

The image processing apparatus according to one exemplary embodiment has a alignment unit 201, a difference detection unit 202, an expansion processing (thickening processing) unit 203, a rounding processing unit 204, a thinning processing unit 205, an end-point extraction unit 206, a pair-of-connection-end-point extraction unit 207, a connection processing unit 208, a line width detection processing unit 209, and an expansion processing (thickening processing) unit 210. Processing executed by each processing unit will be discussed below.

[Alignment Unit]

The alignment unit 201 inputs original document image data 151 as image data read and postscribed document image data 152 containing postscript, which is not contained in the original, through a scanner or the like and aligns those documents.

As a technique of aligning two images, various existing techniques can be applied. Basically, similar feature regions are extracted from the images and the similar feature regions are related to each other. The shift amount between the two images is calculated based on the related feature regions and the documents are aligned while the image data is corrected based on the shift amount.

[Difference Detection Unit]

The difference detection unit 202 performs processing of extracting the difference between the original document image data 151 and the postscribed document image data 152, which are subjected to the alignment. This processing is similar to processing in related arts and is executed as similar processing to that disclosed in JP 2004213230 A and JP 2004-341914 A, which are incorporated herein by reference in its entirety. For example, the presence or absence of a difference between the coordinate position (x, y) of the original document image data 151 and the coordinate position (x, y) of the postscribed document image data 152 is detected and data is extracted only if a difference exists.

An example of a difference extraction processing will be discussed with reference to FIG. 5. In the example shown in FIG. 5, difference extraction is executed from an original document 301 and a postscribed document 302 as in the example previously described with reference to FIG. 2. Unlike the document in FIG. 2, [1] contained in the original is formed of a thin line. The processing is performed, whereby data to be recovered 304, which is difference information, is obtained as in the example previously described with reference to FIG. 2. The original postscribed information is unbroken line data 303.

[Expansion Processing (Thickening Processing) Unit]

The data to be recovered 304 detected by the difference detection unit 202, here, postscribed data, which is difference data, is input into the expansion processing (thickening processing) unit 203. This data is incomplete postscribed data in which a portion overlapping with the original data is broken as described above with reference to FIG. 2.

Figure 6:
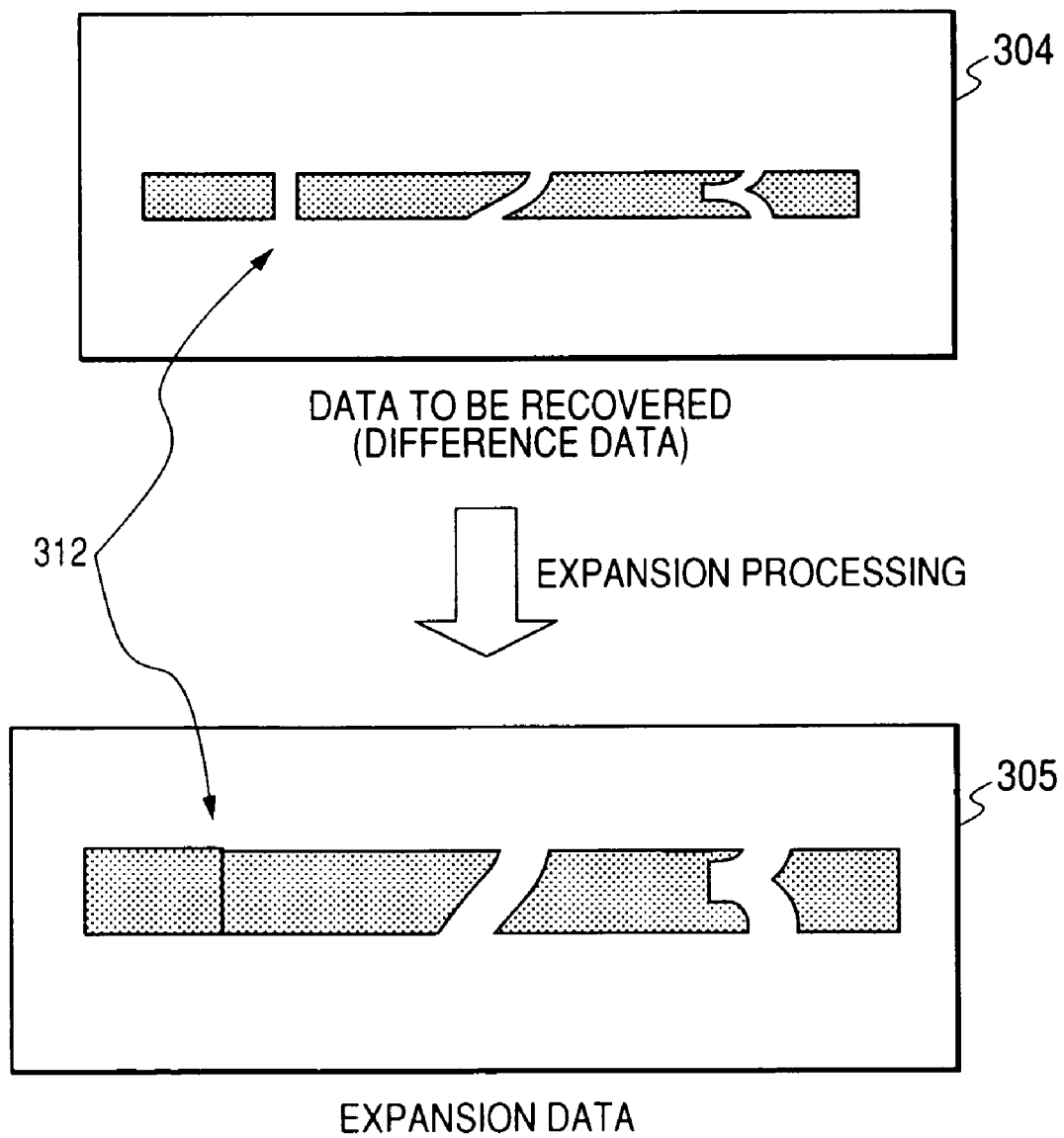
FIG. 6 is a drawing to describe a processing example of an expansion processing unit in the image processing apparatus according to the exemplary embodiment of the invention.

The expansion processing (thickening processing) unit 203 executes expansion processing (thickening processing) of the data to be recovered (difference data) 304. The expansion processing is processing of expanding the data to be recovered (difference data) 304 by n pixels up and down and from side to side, as shown in FIG. 6. Consequently, expansion data 305 is generated. The expansion amount n is determined in accordance with the image to be processed, such as 3 to 10 pixels. As a result of the expansion processing, a break part 312 with a short space is joined to the adjacent part and the break disappears, as shown in FIG. 6.

[Rounding Processing Unit]

The rounding processing unit 204 executes rounding processing of the expansion data 305 resulting from the thickening processing. Corners of the expansion data 305 are rounded to generate rounded expansion data 306, as shown in FIG. 7. For example, if it is determined that a pixel in question at the center of a matrix of three by three pixels corresponds to a corner of a black joint region, the rounding processing is executed as processing of replacing the pixel in question with white.

Figure 8:
FIG. 8 is a drawing to describe pixel patterns to which processing of the rounding processing unit is applied.

FIG. 8 shows examples of pixel data to which rounding processing is applied. FIG. 8 shows the binarized matrix pixel values three by three pixels; 0 denotes white and 1 denotes black. For example, if it is determined that a pixel in question at the center corresponds to a corner of a black joint region, the rounding processing is executed as processing of replacing the pixel in question with white. Patterns 1 to 3 in FIG. 8 show representative patterns corresponding to this condition. The pixel patterns to which rounding processing is applied include patterns provided by rotating the pixel pattern as pattern 1 90 degrees, 180 degrees, and 270 degrees and line symmetry patterns provided by replacing 180 degrees up and down and from side to side, and also include patterns provided by rotating the pixel pattern as pattern 2, 3 90 degrees, 180 degrees, and 270 degrees. Rounding processing, namely, pixel value conversion is performed for the region having component pixels corresponding to such a pattern. The processing is performed, whereby the rounded expansion data 306 as shown in FIG. 7, for example, with rounded corners is generated.

The rounding processing may executed together with the expansion processing at the preceding stage. For example, processing called 4-8 neighborhood expansion processing or 8-4 neighborhood expansion processing can be applied. FIG. 9 shows expansion processing modes. Specifically, FIG. 9A shows 8 neighborhood expansion processing, FIG. 9B shows 4 neighborhood expansion processing, FIG. 9C shows 4-8 neighborhood expansion processing, and FIG. 9D shows 8-4 neighborhood expansion processing.

The 8 neighborhood expansion processing in FIG. 9A is expansion processing of expanding eight pixels surrounding a pixel in question. The 4 neighborhood expansion processing in FIG. 9B is expansion processing of expanding four pixels surrounding a pixel in question in sequence. The 4-8 neighborhood expansion processing in FIG. 9C and the 8-4 neighborhood expansion processing in FIG. 9D are processing of alternately executing 8 neighborhood expansion processing in FIG. 9A and 4 neighborhood expansion processing and are different in that the 4-8 neighborhood expansion processing in FIG. 9C executes the 4 neighborhood expansion processing as the first step and that the 8-4 neighborhood expansion processing in FIG. 9D executes the 8 neighborhood expansion processing as the first step.

The expansion processing shown in FIG. 9 shows the expansion processing process of one pixel. As understood from the figure, the 8 neighborhood expansion processing in FIG. 9A and the 4 neighborhood expansion processing in FIG. 9B provide expansion only to a quadrangle; while, the 4-8 neighborhood expansion processing in FIG. 9C and the 8-4 neighborhood expansion processing in FIG. 9D can provide expansion to an octagon and are produce the round effect.

Figure 10:
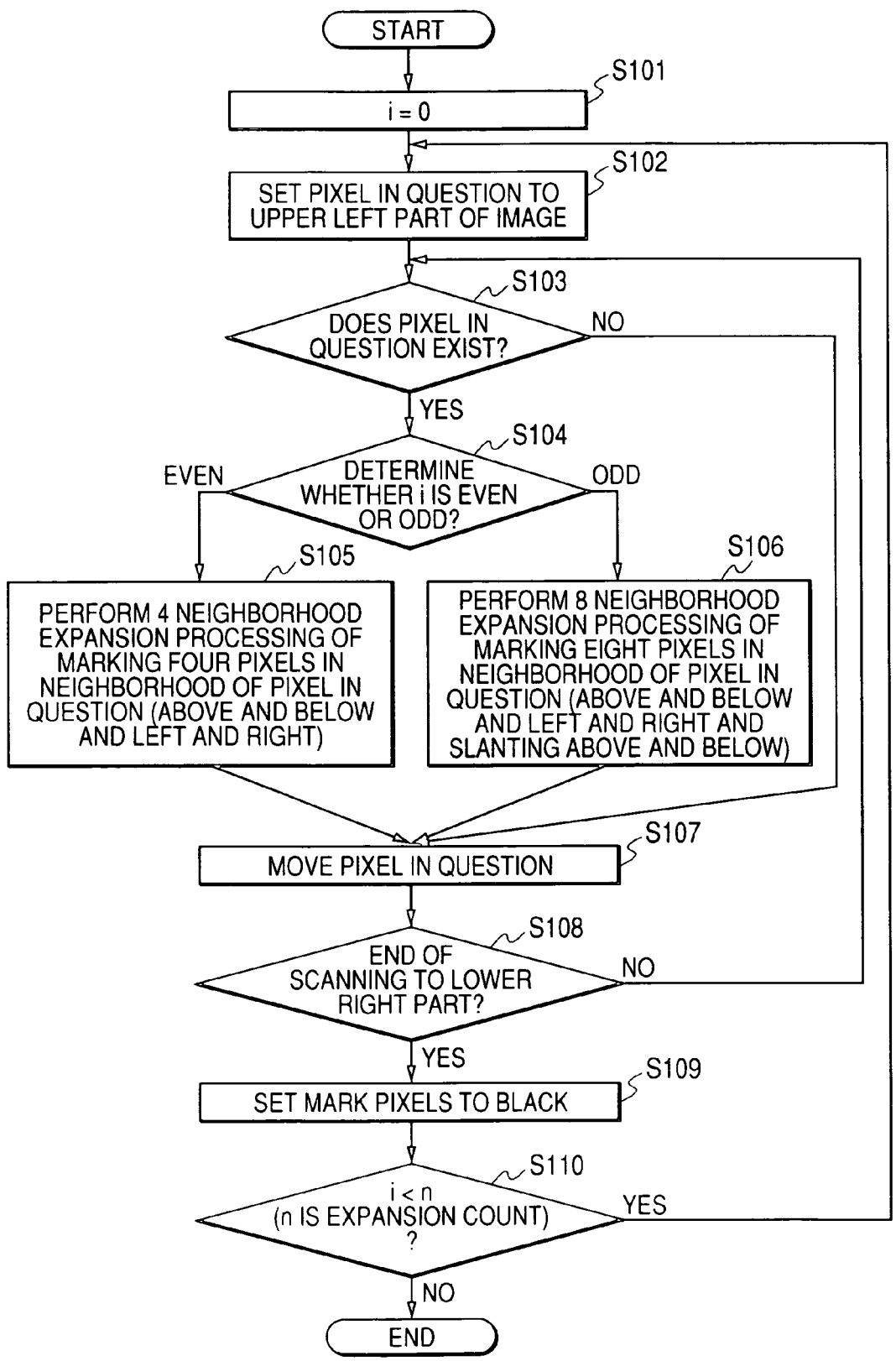
FIG. 10 is a flowchart to describe the processing sequence of expansion processing involving applicable rounding processing in the image processing apparatus according to the exemplary embodiment of the invention.

The processing sequence of the 4-8 neighborhood expansion processing will be discussed with reference to a flowchart of FIG. 10. First, at step S101, a variable i indicating the number of processing times is set to initial value i=0. At step S102, a pixel in question is set to the upper left part of the image. In the processing sequence, processing is executed in sequence along the scan line from the upper left part. Next, at step S103, whether or not a pixel in question exists is determined. If a pixel in question exists, the process goes to step S104 and whether or not the value of the number of processing times i is even or odd is determined.

If the value of the number of processing times i is even, the process goes to step S105 and the 4 neighborhood expansion processing of marking the four pixels in the neighborhood of the pixel in question (above and below and left and right). If the value of the number of processing times i is odd, the process goes to step S106 and the 8 neighborhood expansion processing of marking the eight pixels in the neighborhood of the pixel in question (above and below and left and right and slanting above and below).

At step S107, the pixel in question is moved and at step S108, whether or not processing of all pixels of the processed image is complete is determined. If an unprocessed pixel exists, step S103 and the later steps are executed repeatedly.

Upon completion of the mark processing of all pixels, the process goes to step S109 and all marked pixels are set to black. The set color is an example and processing of applying any pixel value other than black is also possible. Next, the process goes to step S110 and whether or not the number of processing times i reaches a preset number of processing times n (expansion count) is determined. If i<n, step S102 and the later steps are executed repeatedly. When i=n, the processing is terminated.

The processing is performed, so that the 4-8 neighborhood expansion processing is performed and expansion processing having the round effect is performed. As a result, expansion processing and rounding processing are performed as shown in FIG. 9C. When steps S105 and S106 are replaced to each other, the 8-4 neighborhood expansion processing is performed.

[Thinning Processing Unit]

The thinning processing unit 205 inputs the rounded expansion data 306 resulting from the expansion and rounding processing and executes thinning processing to generate thinned line data 307, as shown in FIG. 11. The thinned line data 307 is thin line data having a width of one pixel, for example.

Figure 12:
FIG. 12 is a drawing to describe pixel patterns to which processing of the thinning processing unit is applied in the image processing apparatus according to the exemplary embodiment of the invention.

The thinning processing is executed as processing of detecting the pixel position having a pattern matching a preset pixel pattern from the data to be processed and changing the pixel value. FIG. 12 shows examples of pixel patterns to which the thinning processing is applied. FIG. 12 shows the binarized matrix pixel values of three by three pixels; 0 denotes white, 1 denotes black, and * denotes an arbitrary value. For example, the thinning processing is executed as processing of deleting the pixel in question [1 (black)] at the center of each matrix of three by three pixels and replacing it with [0 (white)]. The example is a processing example wherein the data to be processed is black and the background is white; the data to which the thinning processing is applied and the background color may be combined as desired and the thinning processing can be executed as processing corresponding to each color.

Figure 13:
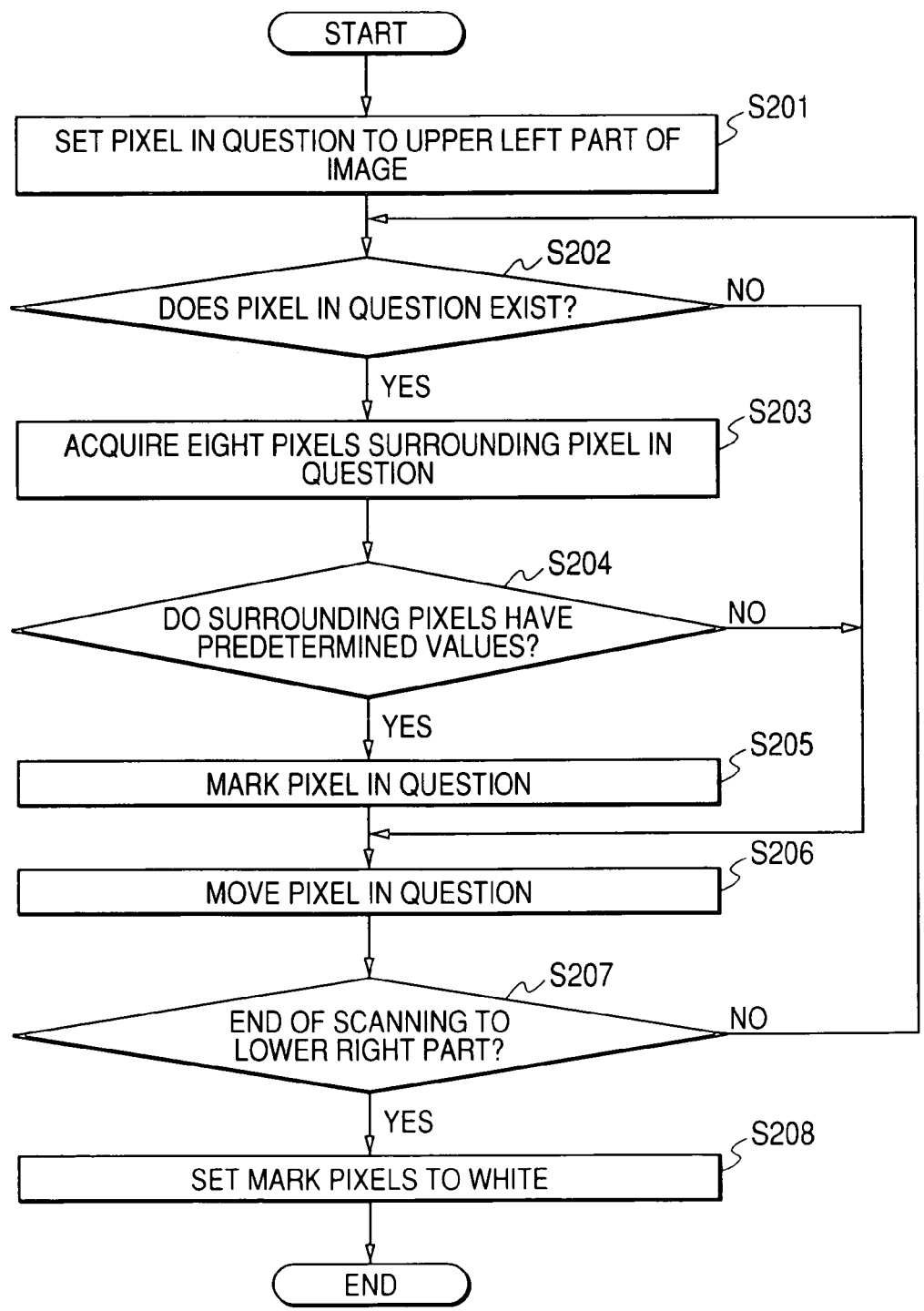
FIG. 13 is a flowchart to describe the processing sequence of the thinning processing in the image processing apparatus according to the exemplary embodiment of the invention.

The processing sequence of the thinning processing will be discussed with reference to a flowchart of FIG. 13. First, at step S201, a pixel in question is set to the upper left part of the image. In the processing sequence, processing is executed in sequence along the scan line from the upper left part. Next, at step S202, whether or not a pixel in question exists is determined. If a pixel in question exists, the process goes to step S203 and the pixel values of the pixels surrounding the pixel in question are acquired.

Next, at step S204, whether or not the surrounding pixel pattern containing the pixel in question matches a predetermined pattern is determined. That is, whether or not the pattern matches any of patterns 1 to 8 shown in FIG. 12 is determined. If the pattern matches any of patterns 1 to 8 shown in FIG. 12, the process goes to step S205 and the pixel in question, namely, the center pixel in any of patterns 1 to 8 shown in FIG. 12 is marked. Next, at step S206, the pixel in question is moved and at step S207, whether or not processing of all pixels of the processed image is complete is determined. If an unprocessed pixel exists, step S202 and the later steps are executed repeatedly.

Upon completion of the mark processing of all pixels, the process goes to step S208 and all mark pixels are set to white. As described above, the set color is an example and the thinning processing may be executed in a similar manner for any other desired color. The processing is performed, whereby the thinned line data 307 shown in FIG. 11 is generated.

[Endpoint Extraction Unit]

The thinned line data 307 generated by the thinning processing unit 205 is input into the end-point extraction unit 206. The end-point extraction unit 206 extracts end points of the thinned line data to generate end-point extraction data 308, as shown in FIG. 14. The end-point extraction data 308 shown in the figure shows an example of extracting six endpoints of P1 to P6.

[Pair-Of-Connection-End-Point Extraction Unit]

The end-point extraction data 308 generated by the endpoint extraction unit 206 is input into the pair-of-connection-end-point extraction unit 207. The connection end-point extraction unit 206 determines a connection relationship between end points, and generates pair-of-connection-end-point extraction data 309, as shown in FIG. 15.

The pair-of-connection-end-point extraction unit 207 executes pair-of-connection-end-point extraction processing, for example, by applying any of the following three types of processing:

a: searching for an end point closest to an end point in question, and setting the searched closest end point as a connection end point if the closest end point is within a preset distance from the end point in question;

b: calculating an extension direction of a line segment jointed to an end point in question from several dots making up the line segment, and setting an end point, which is closest to the end point in question and located on an extension of the line segment in the calculated extension direction, as a connection end point; and c: calculating a fitting curve for a line segment jointed to an end point in question from tens dots making up the line segment and setting an end point, which is closest to the end point in question and located on the extension of the calculated fitting curve as a connection end point.

If two end points corresponding to any of a to c is detected, the pair-of-connection-end-point extraction unit 207 extracts the end points as a pair of connection end points. The example of the pair-of-connection-end-point extraction data 309 shown in FIG. 15 shows that end points P2 and P3 and end points P4 and P5 are extracted as pair of connection end points.

[Connection Processing Unit]

The pair-of-connection-end-point extraction data 309 generated by the pair-of-connection-end-point extraction unit 207 is input into the connection processing unit 208. Te connection processing unit 208 executes pair-of-connection-end-point connection processing to generate end-point connection data 310, as shown in FIG. 16. The connection processing is performed with respect to thinned line data and the connection processing between the pair of connection end points is executed using a line of the same pixel width as the thinned line data (one pixel). As a result of the processing, the end-point connection data 310 shown in FIG. 16 is generated.

[Line Width Detection Processing Unit]

The line width detection processing unit 209 performs processing of detecting the line width as an index of the expansion amount applied when the expansion processing unit (thickening processing section) 210 at the following stage executes processing of restoring the end-point connection data 310 generated by the connection processing unit 208 to the original line width. The line width is equal to that of the data to be recovered in the original image. The line width is detected based on the following expression:

Line width=line area/line length

The line area is the number of pixels of the whole data to be recovered 304 shown in FIG. 6, and the line length is the total length of the line segments of the thinned line data 307 shown in FIG. 11, generated by the thinning processing unit 205. The line width detection processing unit 209 calculates the line width of the data to be recovered according to the expression [line width=line area÷line length].

[Expansion Processing Unit (Thickening Processing Section)]

The end-point connection data 310 generated by the connection processing unit 208 is input into the expansion processing unit (thickening processing section) 210. The expansion processing unit (thickening processing section) 210 executes expansion processing based on the line width of the data to be recovered, calculated by the line width detection processing unit 209 according to the expression [line width=line area÷line length] to generate restoration data 311, as shown in FIG. 17.

Figure 5:
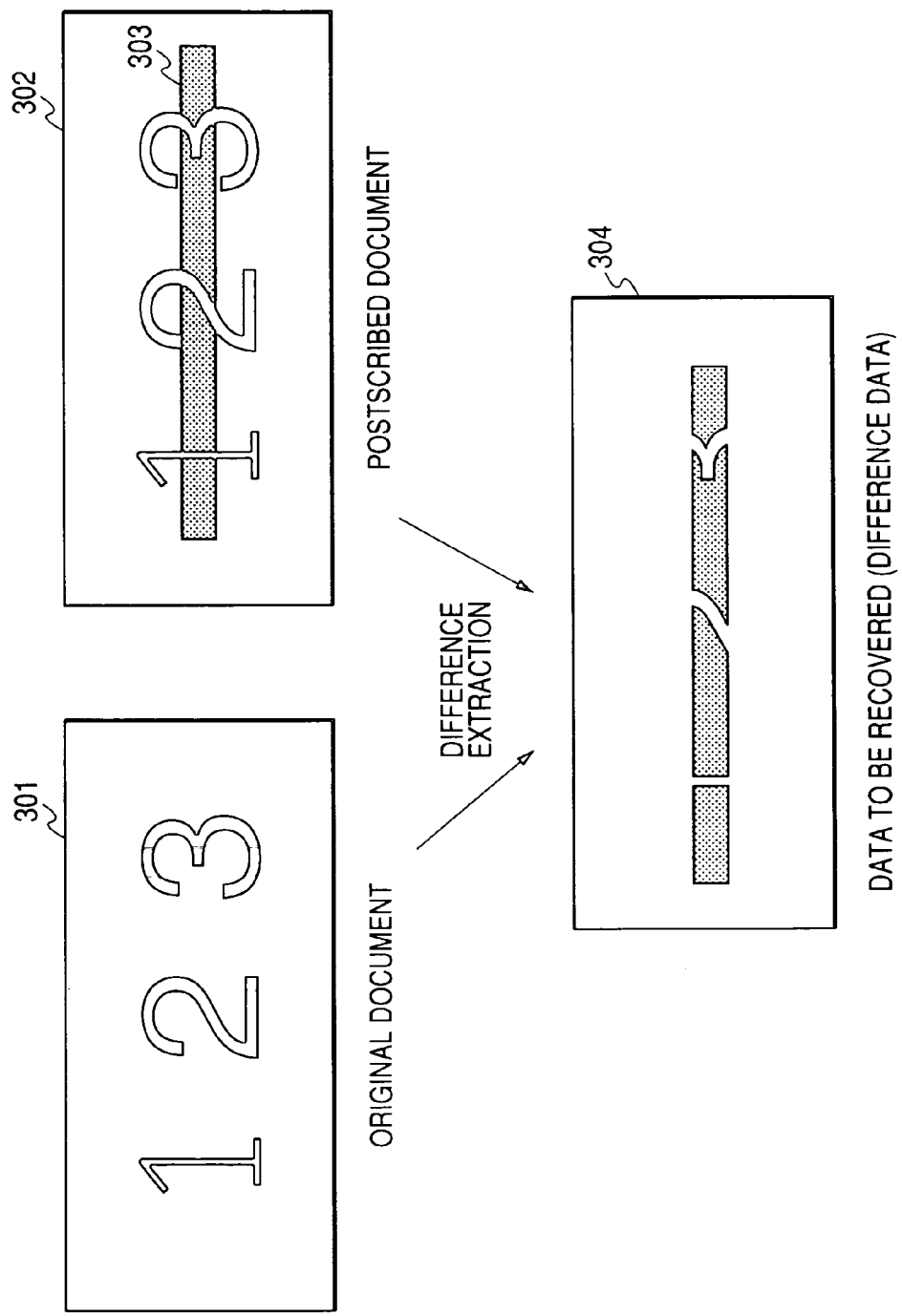
FIG. 5 is a drawing to describe examples of data to be processed by the image processing apparatus according to the exemplary embodiment of the invention.

The restoration data 311 shown in FIG. 17 becomes line data indicating the original postscribed data in which the breaks, which are the loss parts of the data to be recovered (difference data) 304 shown in FIG. 5, are completely recovered.

Next, the whole sequence of the recovery processing of the loss parts of the data to be recovered, executed in the image processing apparatus of the invention will be discussed with reference to a flowchart of FIG. 18.

Figure 18:
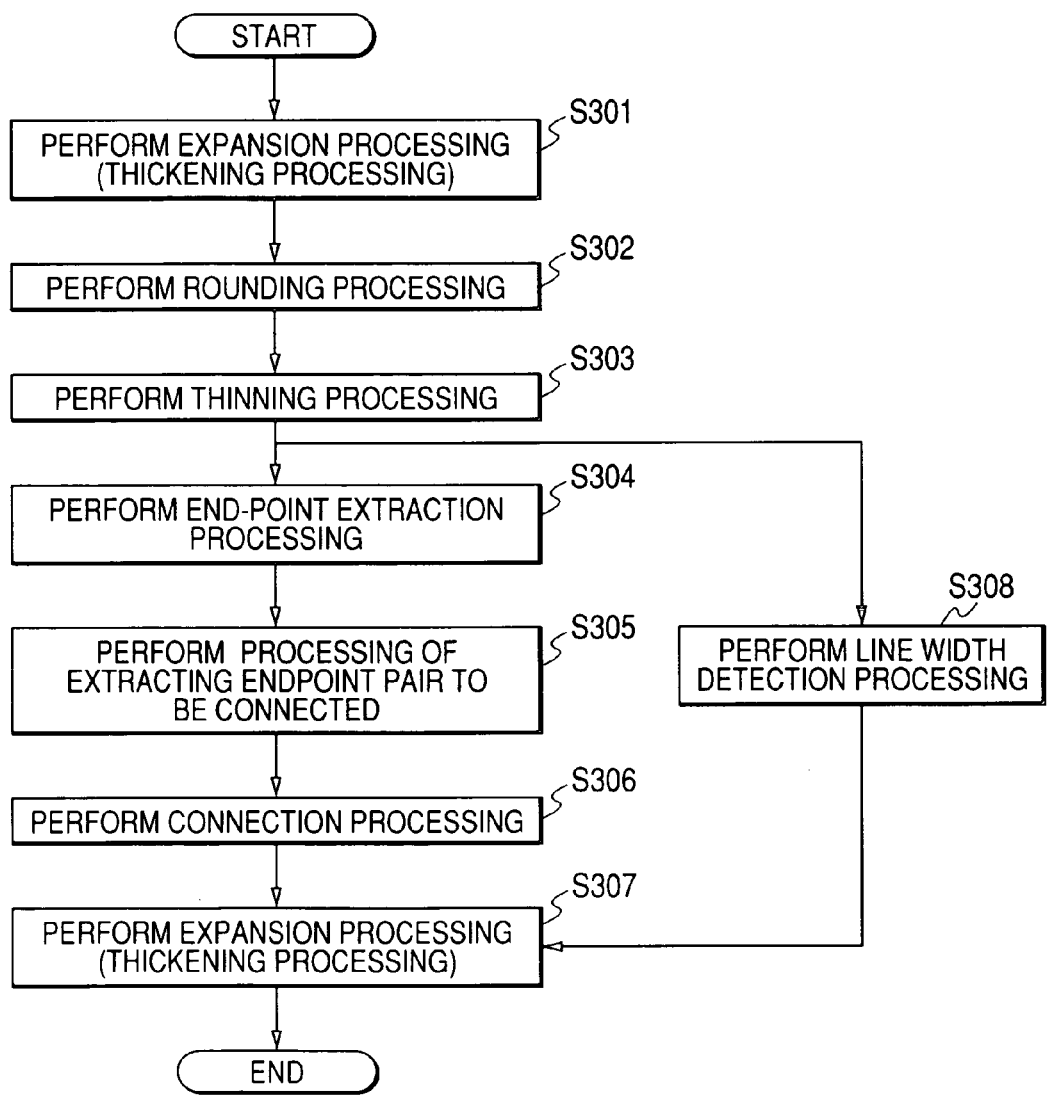
FIG. 18 is a flowchart to describe a processing sequence in the image processing apparatus according to the exemplary embodiment of the invention.

The processing shown in FIG. 18 shows the processing of the expansion processing unit 203 and the means at the following stages of the image processing apparatus shown in FIG. 4. The data to be processed in the invention is general data acquired as data containing a loss part by performing various types of processing, such as data extracted by color determination and ruled line removal data, in addition to the difference data between a postscribed document and an original document as previously described with reference to FIGS. 2 and 3.

The steps of the flowchart of FIG. 18 will be discussed. Step S301 is processing of the expansion processing (thickening processing) unit 203 shown in FIG. 4, wherein the data to be recovered having loss parts is input and expansion processing (thickening processing) is executed. The expansion processing is processing of expanding the data to be recovered (difference data) 304 n pixels up and down and from side to side, as shown in FIG. 6. Consequently, the expansion data 305 is generated. The expansion amount n is determined in response to the image to be processed, such as three to 10 pixels. As a result of the expansion processing, the break part 312 with a short space is joined to the adjacent part and the break disappears, as shown in FIG. 6.

Next, rounding processing is executed at step S302. The processing is the processing of the rounding processing unit 204 shown in FIG. 4. The corners of the expansion data 305 are rounded to generate the rounded expansion data 306, as shown in FIG. 7. For example, if it is determined that the center pixel in question of a matrix of three by three pixels corresponds to a corner of a black joint region, the rounding processing is executed as processing of replacing the pixel in question with white, as previously described with reference to FIG. 8. For example, the 4-8 neighborhood expansion processing, etc., is applied, whereby expansion processing and rounding processing can be executed as one processing, as previously described with reference to FIGS. 9 and 10.

Next, thinning processing is executed at step S303. The processing is the processing of the thinning processing unit 205 shown in FIG. 4. The rounded expansion data 306 resulting from the expansion and rounding processing is input and the thinning processing is executed to generate the thinned line data 307, as shown in FIG. 11. The thinned line data 307 is thin line data having a width of one pixel, for example. The thinning processing is executed as processing of detecting the pixel position having a pattern matching a pixel pattern previously described with reference to FIG. 12, for example, from the data to be processed and changing the pixel value previously described with reference to the flowchart of FIG. 13.

Next, end-point extraction processing is executed at step S304. The processing is the processing of the end-point extraction unit 206 shown in FIG. 4. The thinned line data 307 generated by the thinning processing unit is input and the endpoints of the thinned line data are extracted to generate the end-point extraction data 308, as shown in FIG. 14.

Next, connected endpoint pair extraction processing is executed at step S305. The processing is the processing of the pair-of-connection-end-point extraction unit 207 shown in FIG. 4. The pair-of-connection-end-point extraction unit 207 inputs the end-point extraction data 308 generated by the end-point extraction unit 206, determines the connection relationship between the endpoints, and generates the pair-of-connection-end-point extraction data 309, as shown in FIG. 15.

The processing is executed as any of the following three types of processing as described above:

a: searching for an end point closest to an end point in question, and setting the searched closest end point as a connection end point if the closest end point is within a preset distance from the end point in question;

b: calculating an extension direction of a line segment jointed to an end point in question from several dots making up the line segment, and setting an end point, which is closest to the end point in question and located on an extension of the line segment in the calculated extension direction, as a connection end point; and c: calculating a fitting curve for a line segment jointed to an end point in question from tens dots making up the line segment and setting an end point, which is closest to the end point in question and located on the extension of the calculated fitting curve as a connection end point.

Next, endpoint pair connection processing is executed at step S306. The processing is the processing of the connection processing unit 208 shown in FIG. 4. The connection processing unit 208 inputs the pair-of-connection-end-point extraction data 309 generated by the pair-of-connection-end-point extraction unit 207 and executes pair-of-connection-end-point connection processing to generate the end-point connection data 310, as shown in FIG. 16. The connection processing is performed for thinned line data and the pair-of-connection-end-point connection processing is executed using a line of the same pixel width as the thinned line data (one pixel). As a result of the processing, the end-point connection data 310 shown in FIG. 16 is generated.

Next, expansion processing (thickening processing) is executed at step S307. The processing is the processing of the expansion processing unit (thickening processing section) 210 shown in FIG. 4. The expansion processing unit (thickening processing section) 210 inputs the end-point connection data 310 generated by the connection processing unit 208 and executes expansion processing to generate the restoration data 311, as shown in FIG. 17.

The expansion processing unit (thickening processing section) 210 executes expansion processing based on the line width calculated by the line width detection processing unit 209 shown in FIG. 4 according to the above-described expression line width=line area÷line length The line width detection processing unit 209 shown in FIG. 4 executes the line width calculation processing according to the expression [line width=line area÷line length] at step S308 in the flowchart, and the expansion processing unit (thickening processing section) 210 executes the expansion processing based on the value.

The processing has been described basically as a configuration example of executing the processing of all of the expansion processing unit 203 to the expansion processing unit 210 shown in FIG. 4. That is, it has been described as the processing of the image processing apparatus having the first expansion processing unit 203 for executing the expansion processing of the data to be recovered comprising a loss part, the rounding processing unit 204 for inputting the processing result of the expansion processing unit 203 and executing the rounding processing, the thinning processing unit 205 for inputting the processing result of the rounding processing unit 204 and executing the thinning processing, the end-point extraction unit 206 for inputting the processing result of the thinning processing unit 205 and executing the end-point extraction processing, the pair-of-connection-end-point extraction unit 207 for extracting the pair of connection end points to be connected from the endpoints extracted by the end-point extraction unit 206, the connection processing unit 208 for connecting the pair of connection end points extracted by the pair-of-connection-end-point extraction unit 207, the line width detection processing unit 209, and the second expansion processing unit 210 for executing the expansion processing of the data generated by the connection processing unit 208 to generate restoration data with the loss part corrected.

However, a processing configuration of omitting several processing unit of the processing unit described above is also possible. For example, if the image processing apparatus is made up of only the thinning processing unit for executing the thinning processing of the data to be recovered comprising a loss part, the end-point extraction unit for inputting the processing result of the thinning processing unit and executing the end-point extraction processing, the pair-of-connection-end-point extraction unit for extracting the pair of connection end points to be connected from the endpoints extracted by the end-point extraction unit, and the connection processing unit for connecting the pair of connection end points extracted by the pair-of-connection-end-point extraction unit, basically the data with the loss part corrected can be acquired and it is made possible to acquire the data with the loss part corrected by performing simplified processing as processing such as the expansion processing is skipped.

Figure 19:
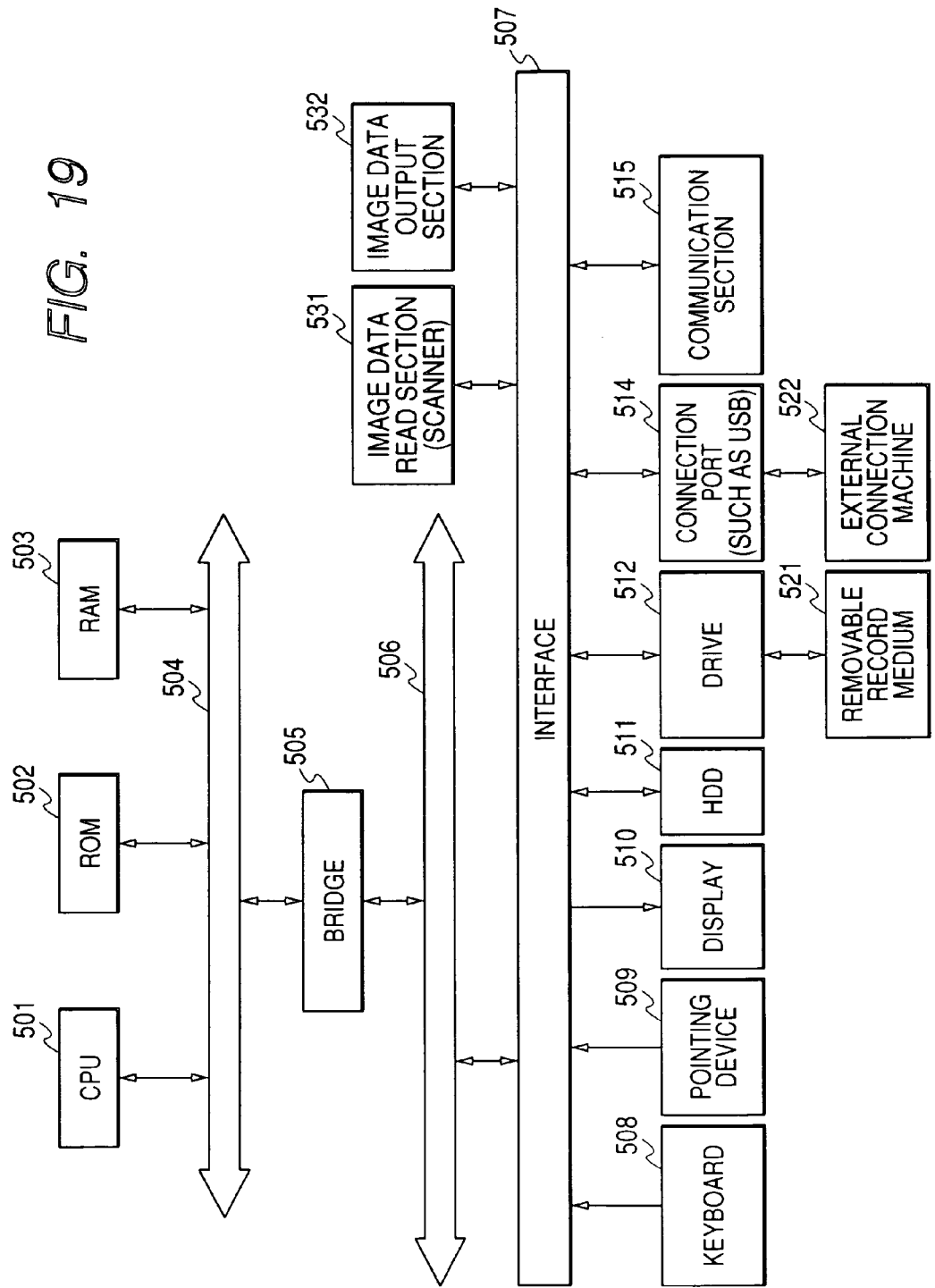
FIG. 19 is a diagram to describe a hardware configuration example of the image processing apparatus according to the exemplary embodiment of the invention.

Last, a hardware configuration example of the image processing apparatus for executing the processing described above will be discussed with reference to FIG. 19. The configuration shown in FIG. 19 is a hardware configuration example including an image processing apparatus such as a PC, an image data read section 531 such as a scanner, and an image data output section 532 such as a printer.

A CPU (Central Processing Unit) 501 executes the various types of data processing previously described in the embodiment, namely, the extraction processing of data containing a loss part such as difference data and the expansion processing, the rounding processing, the thinning processing, the end-point extraction processing, the pair-of-connection-end-point extraction processing, the connection processing, the line width detection processing, and the expansion processing of the data to be processed. The CPU 501 executes the processing in accordance with a computer program describing the execution sequence of the processing.

ROM (Read-Only Memory) 502 stores programs, operation parameters, etc., used by the CPU 501. RAM (Random Access Memory) 503 stores programs used in execution of the CPU 501, parameters changing appropriately in the execution of the CPU 501, and the like. They are connected by a host bus 504 implemented as a CPU bus, etc.

The host bus 504 is connected to an external bus 506 such as a PCI (Peripheral Component Interconnect/Interface) bus through a bridge 505.

A keyboard 508 and a pointing device 509 are input devices operated by the user. A display 510 is implemented as a liquid crystal display, a CRT (Cathode Ray Tube), or the like for displaying various pieces of information as text and image information.

An HDD (Hard Disk Drive) 511 contains a hard disk and drives the hard disk for recording or playing back a program and information executed by the CPU 501. The hard disk stores information such as original document image data and postscribed document image data, data generated in various types of processing, and the like. Further, the hard disk stores various data processing programs, various computer programs, etc.

A drive 512 reads data or a program recorded on a mounted removable record medium 521 such as a magnetic disk, an optical disk, a magneto-optical disk, or semiconductor memory, and supplies the data or the program to the RAM 503 connected through the interface 507, the external bus 506, the bridge 505, and the host bus 504. The removable record medium 521 can also be used as a data record area like a hard disk.

A connection port 514 is a port for connecting an external connection machine 522 and has a connection section of a USB, IEEE 1394, etc. The connection port 514 is connected to the CPU 501, etc., through the interface 507, the external bus 506, the bridge 505, the host bus 504, etc. A communication section 515 is connected to a network for executing data communication processing with an external system. A data read section 531 executes document read processing, and a data output section 532 executes document data output processing.

The hardware configuration example of the image processing apparatus shown in FIG. 19 is one system example and the image processing apparatus of the invention is not limited to the configuration shown in FIG. 19 and may be any if it can execute the processing previously described in the embodiment.

While the invention has been described in detail in its preferred embodiments, it is to be understood that modifications will be apparent to those skilled in the art without departing from the spirit and the scope of the invention. That is, the invention is disclosed for illustrative purposes only and it is to be understood that the invention is not limited to the specific embodiments thereof except as defined in the claims.

The processing sequence described in the specification can be executed by both or either of hardware and software. To execute software processing, the program recording the processing sequence can be installed in memory in a computer incorporated in dedicated hardware for execution or can be installed in a general-purpose computer that can execute various types of processing for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of processing described in the specification may be executed not only in time sequence according to the description, but also in parallel or individually in response to the processing capability of the apparatus for executing the processing or as required. The system in the specification is a logical set made up of a plurality of units (apparatus) and is not limited to a set of units (apparatus) housed in a single cabinet.

What is claimed is:

1. An image processing apparatus into which image data is to be recovered having a loss part, the image processing apparatus for generating restoration data with the loss part corrected, the image processing apparatus comprising:
a thinning processing unit that executes thinning processing with respect to the image data to be recovered having the loss part;
an end-point extraction unit that executes finding end points of thinned lines of the image data generated by the thinning processing unit;
a pair-of-connection-end-point extraction unit that extracts a pair of connection end points to be connected from the end points extracted by the end-point extraction unit; and
a connection unit that connects the pair of connection end points extracted by the pair-of-connection-end-point extraction unit; and
a rounding processing unit that executes rounding processing with respect to the image data to be recovered prior to the thinning processing of the thinning processing unit, wherein the image data to be recovered subjected to the rounding processing executed by the rounding processing unit is input into the thinning processing unit.

2. The apparatus according to claim 1, further comprising:
an expansion processing unit that executes expansion processing with respect to the image data to be recovered prior to the thinning processing of the thinning processing unit, wherein:
the image data to be recovered subjected to the expansion processing executed by the expansion processing unit is input into the thinning processing unit.

3. The apparatus according to claim 2, wherein the expansion processing unit executes 8-4 neighborhood expansion processing or 4-8 neighborhood expansion processing as the expansion processing.

4. The apparatus according to claim 1, further comprising:
an expansion processing unit that executes expansion processing with respect to data generated by the connection unit to generate the restoration data with the loss part corrected.

5. The apparatus according to claim 1, wherein:
the rounding processing unit determines a pixel position corresponding to a preset pixel pattern, and
the rounding processing unit executes the rounding processing by changing a pixel value of the determined pixel.

6. The apparatus according to claim 1, wherein:
the thinning processing unit determines a pixel position corresponding to a preset pixel pattern, and
the thinning processing unit executes the thinning processing by changing a pixel value of the determined pixel.

7. The apparatus according to claim 1, wherein the pair-of-connection-end-point extraction unit extracts the pair of connection end points based on processing of any of the following (a) to (c):
(a) searching for an end point closest to an end point in question, and setting the searched closest end point as a connection end point if the closest end point is within a preset distance from the end point in question;
(b) calculating an extension direction of a line segment jointed to an end point in question from a plurality of pixels making up the line segment, and setting an end point, which is closest to the end point in question and located on an extension of the line segment in the calculated extension direction, as a connection end point; and
(c) calculating a fitting curve for a line segment jointed to an end point in question from a plurality of pixels making up the line segment and setting an end point, which is closest to the end point in question and located on the extension of the calculated fitting curve as a connection end point.

8. An image processing apparatus into which image data to be recovered having a loss part is input, the image processing apparatus for generating restoration data with the loss part corrected, the image processing apparatus comprising:
a first expansion processing unit that executes expansion processing with respect to the image data to be recovered having the loss part;
a rounding processing unit that executes rounding process with respect to a processing result of the first expansion processing unit;
a thinning processing unit that executes thinning process with respect to a processing result of the rounding processing unit;
an end-point extraction unit that executes finding end points of thinned lines of a processing result of the thinning processing unit;
a pair-of-connection-end-point extraction unit that extracts a pair of connection end points to be connected from the end points extracted by the end-point extraction unit;
a connection unit that connects the pair of connection end points extracted by the pair-of-connection-end-point extraction unit; and
a second expansion processing unit that executes expansion processing with respect to data generated by the connection unit to generate the restoration data with the loss part corrected.

9. The apparatus according to claim 8, wherein:
the second expansion processing unit executes the expansion processing with respect to lines in the data generated by the connection unit so that the following expression is satisfied:

line width=line area/line length where the line width represents a line width after expansion processing, the line area corresponds to number of pixels making up the lines in the input image, and the line length represents a total length of line segments making up thinned lines generated by the thinning processing unit.

10. An image processing method for inputting image data to be recovered having a loss part and generating restoration data with the loss part corrected, the method comprising:
executing thinning processing with respect to the image data to be recovered having the loss part;
executing end-point extraction processing with respect to a processing result of the thinning processing;
extracting a pair of connection end points to be connected from end points extracted by the end-point extraction processing;
connecting the pair of connection end points extracted; and
executing rounding processing with respect to the image data to be recovered prior to the thinning processing, wherein the thinning processing is executed with respect to the data to be recovered subjected to the rounding processing.

11. The method according to claim 10, further comprising: executing expansion processing with respect to the image data to be recovered prior to the thinning processing, wherein:

the thinning processing is executed with respect to the data to be recovered subjected to the expansion processing executed.

12. The method according to claim 11, wherein the expansion processing comprises 8-4 neighborhood expansion processing or 4-8 neighborhood expansion processing.

13. The method according to claim 10, further comprising: executing expansion processing with respect to data generated by the connecting to generate the restoration data with the loss part corrected.

14. The method according to claim 10, wherein:
the executing of the rounding processing comprises:
determining a pixel position corresponding to a preset pixel pattern; and
executing the rounding processing by changing a pixel value of the determined pixel.

15. The method according to claim 10, wherein:
the executing of the thinning processing comprises determining a pixel position corresponding to a preset pixel pattern; and
executing the thinning processing by changing a pixel value of the determined pixel.

16. The method according to claim 10, wherein the extracting of the pair of connection end points comprises extracting the pair of connection end points based on processing of any of the following (a) to (c):

(a) searching for an end point closest to an end point in question, and setting the searched closest end point as a connection end point if the closest end point is within a preset distance from the end point in question;

(b) calculating an extension direction of a line segment jointed to an end point in question from a plurality of pixels making up the line segment, and setting an end point, which is closest to the end point in question and located on an extension of the line segment in the calculated extension direction, as a connection end point; and (c) calculating a fitting curve for a line segment jointed to an end point in question from a plurality of pixels making up the line segment and setting an end point, which is closest to the end point in question and located on the extension of the calculated fitting curve as a connection end point.

17. An image processing method for inputting image data to be recovered comprising a loss part and generating restoration data with the loss part corrected, the method comprising:

executing expansion processing with respect to the image data to be recovered comprising the loss part;

executing rounding processing with respect to a processing result of the expansion processing;

executing thinning processing with respect to a processing result of the rounding processing;

finding end points of thinned lines of data generated by the thinning processing;

extracting a pair of connection end points to be connected from the found end points;

connecting the pair of connection end points extracted; and executing expansion processing with respect to data generated by the connecting to generate the restoration data with the loss part corrected.

18. The method according to claim 17, wherein:
the expansion processing is executed with respect to the data generated by the connecting so that the following expression is satisfied:

line width=line area/line length where the line width represents a line width after the expansion processing, the line area corresponds to number of pixels making up the lines in the input image, and the line length represents a total length of line segments making up thinned lines generated by the thinning processing unit.

19. A computer readable medium storing a program causing a computer to execute a process for inputting image data to be recovered having a loss part and generating restoration data with the loss part corrected, the process comprising:

executing thinning processing with respect to the image data to be recovered having the loss part;

executing end-point extraction processing with respect to a processing result of the thinning processing;

extracting a pair of connection end points to be connected from end points extracted by the end-point extraction processing; and connecting the pair of connection end points extracted; and executing rounding processing with respect to the image data to be recovered prior to the thinning processing, wherein the thinning processing is executed with respect to the data to be recovered subjected to the rounding processing.

20. A computer readable medium storing a program causing a computer to execute a process for inputting image data to be recovered comprising a loss part and generating restoration data with the loss part corrected, the process comprising:

executing expansion processing with respect to the image data to be recovered comprising the loss part;

executing rounding processing with respect to a processing result of the expansion processing;

executing thinning processing with respect to a processing result of the rounding processing;

finding end points of thinned lines of data generated by the thinning processing;

extracting a pair of connection end points to be connected from the found end points;

connecting the pair of connection end points extracted; and executing expansion processing with respect to data generated by the connecting to generate the restoration data with the loss part corrected.

* * * * *